United States Patent
Smiciklas et al.

(10) Patent No.: US 11,181,374 B2
(45) Date of Patent: Nov. 23, 2021

(54) GYROSCOPE WITH REDUCED BIAS ERRORS DUE TO RESONANCE ASYMMETRIES

(71) Applicant: Honeywell International Inc., Morris Plains, NJ (US)

(72) Inventors: Marc Smiciklas, Phoenix, AZ (US); Glen A. Sanders, Scottsdale, AZ (US); Lee K. Strandjord, Tonka Bay, MN (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 16/799,663

(22) Filed: Feb. 24, 2020

(65) Prior Publication Data

US 2021/0262799 A1 Aug. 26, 2021

(51) Int. Cl.
*G01C 19/72* (2006.01)

(52) U.S. Cl.
CPC ......... *G01C 19/721* (2013.01); *G01C 19/727* (2013.01)

(58) Field of Classification Search
CPC ..... G01C 19/721; G01C 19/727; G01C 19/72
See application file for complete search history.

(56) References Cited

U.S. PATENT DOCUMENTS

| | | | |
|---|---|---|---|
| 5,289,258 A | 2/1994 | Szafraniec et al. | |
| 5,450,198 A | 9/1995 | Killpatrick et al. | |
| 9,772,189 B2 | 9/2017 | Strandjord et al. | |
| 2008/0079947 A1 | 4/2008 | Sanders et al. | |
| 2014/0044142 A1* | 2/2014 | Strandjord | H01S 3/1303 372/32 |
| 2016/0334217 A1* | 11/2016 | Strandjord | G02B 6/2934 |
| 2018/0143022 A1* | 5/2018 | Sanders | G01C 19/72 |

OTHER PUBLICATIONS

Zarinetchi et al., "Observation of lock-in behavior in a passive resonator gyroscope", Optics Letters, Jun. 1986, pp. 401 through 403, vol. 11, No. 6, Optical Society of America.
Chang et al., "Resonance asymmetry phenomenon in waveguide-type optical ring resonator gyro", Optics Communications 285, Nov. 28, 2011, pp. 1134 through 1139, Elsevier.
European Patent Office, "Extended European Search Report from EP Application No. 21155876.2", from Foreign Counterpart to U.S. Appl. No. 16/799,663, filed Jul. 2, 2021, pp. 1 through 10, Published: EP.

* cited by examiner

*Primary Examiner* — Dominic J Bologna
(74) *Attorney, Agent, or Firm* — Fogg & Powers LLC

(57) ABSTRACT

A resonator fiber optic gyroscope (RFOG) that includes at least one laser, a resonator and a resonator hopping control system is provided. The resonator is in operational communication with the at least one laser to receive a clockwise (CW) laser light and counterclockwise (CCW) laser light produced by the at least one laser. The resonance hopping control system is in communication with an output of the resonator and the at least one laser. The resonance hopping control system is configured to control an output of the at least one laser to periodically unlock, hop and lock frequencies of the laser light traveling in the CW and CCW directions in the resonator to resonance frequencies of the resonator to mitigate bias errors due to resonance asymmetries.

20 Claims, 4 Drawing Sheets

GYROSCOPE WITH REDUCED BIAS ERRORS DUE TO RESONANCE ASYMMETRIES

BACKGROUND

The Resonator Fiber Optic Gyroscope (RFOG) shows promise in meeting needs of many navigation and inertial stabilization markets. RFOGs have the potential to provide a highest possible rotation sensing performance within a smallest possible volume. An RFOG senses rotation by measuring the frequency difference between optical resonances for counterpropagating light in a fiber ring resonator. This is accomplished by coupling separate lasers into clockwise (CW) and counterclockwise (CCW) directions of the resonator, tuning the lasers to the CW and CCW optical resonances, and then carefully measuring the center frequencies of those resonances.

A problem that can affect those measurements (and introduce a bias in the gyroscope rate output) is a resonance asymmetry that can shift the measured center frequency. Resonance asymmetries can be caused, for example, by optical back-reflections in the resonator. For an RFOG to achieve a desired high performance, it is crucial to mitigate bias errors due to these resonance asymmetries. Though much effort is put into reducing optical back-reflections, eliminating them is technically infeasible. Thus, mitigation techniques have been developed to reduce the bias errors by quickly modulating them and averaging them out of the gyro signal. This has been done in the past by modulating the resonator cavity length either with a piezoelectric transducer (PZT) or by changing the resonator's temperature. However, observations show that using the PZT does not provide enough range to average over the bias errors, and changing temperature is generally too slow and has higher power requirements. Therefore, a method is needed to reduce these resonance asymmetry induced bias errors that is robust, low power, and can quickly average over a very large resonance-frequency range of the optical resonator.

SUMMARY

The following summary is made by way of example and not by way of limitation. It is merely provided to aid the reader in understanding some of the aspects of the subject matter described. Embodiments provide systems and methods to reduce resonance asymmetry induced bias error using a resonance hopping technique in which optical resonances over a very large range of frequencies are quickly sampled to average over resonance asymmetries. This averaging process reduces rotation rate errors.

In one embodiment, a resonator fiber optic gyroscope (RFOG) that includes at least one laser, a resonator and a resonator hopping control system is provided. The resonator is in operational communication with at least one laser to receive a clockwise (CW) laser light and counterclockwise (CCW) laser light produced by at least one laser. The resonance hopping control system is in communication with an output of the resonator and at least one laser. The resonance hopping control system is configured to control an output of the at least one laser to periodically unlock, hop and lock frequencies of the laser light traveling in the CW and CCW directions in the resonator to resonance frequencies of the resonator to mitigate bias errors due to resonance asymmetries.

In another example embodiment, a method of reducing gyroscope bias errors due to resonance asymmetries is provided. The method includes periodically unlocking, hopping and locking frequencies of laser light traveling in clockwise (CW) and counter-clockwise (CCW) directions in a resonator of a gyroscope to mitigate bias errors due to resonance asymmetries; measuring center frequencies of resonances in the CW and CCW directions of the resonator when the signals indicate that light is locked on the resonance frequencies; determining differences between the measured center frequencies of the resonances in the CW and CCW directions; and determining a rotation rate of the gyroscope based at least in part on the determined differences.

In yet another embodiment, a method of reducing gyroscope bias errors due to resonance asymmetries is provided. The method includes generating clockwise (CW) laser light in a resonator with a first slave laser; generating counter-clockwise (CCW) laser light in the resonator with a second slave laser; controlling outputs of the first slave laser and the second slave laser with a master laser; and periodically, unlocking frequencies of the CW laser light and CCW laser light from a resonance of the resonator, hopping the CW laser light and CCW laser light to a different resonance frequency of the resonator within a window of frequencies, wherein the window of frequencies allows the first slave laser, the second slave laser and the maser slave laser to remain in a single mode of operation, and locking the CW laser light and the CCW laser light to the hopped different resonance frequency.

BRIEF DESCRIPTION OF THE DRAWINGS

Embodiments can be more easily understood and further advantages and uses thereof will be more readily apparent, when considered in view of the detailed description and the following figures in which.

In accordance with common practice, the various described features are not drawn to scale but are drawn to emphasize specific features relevant to the subject matter described. Reference characters denote like elements throughout Figures and text.

DETAILED DESCRIPTION

Figure 1:
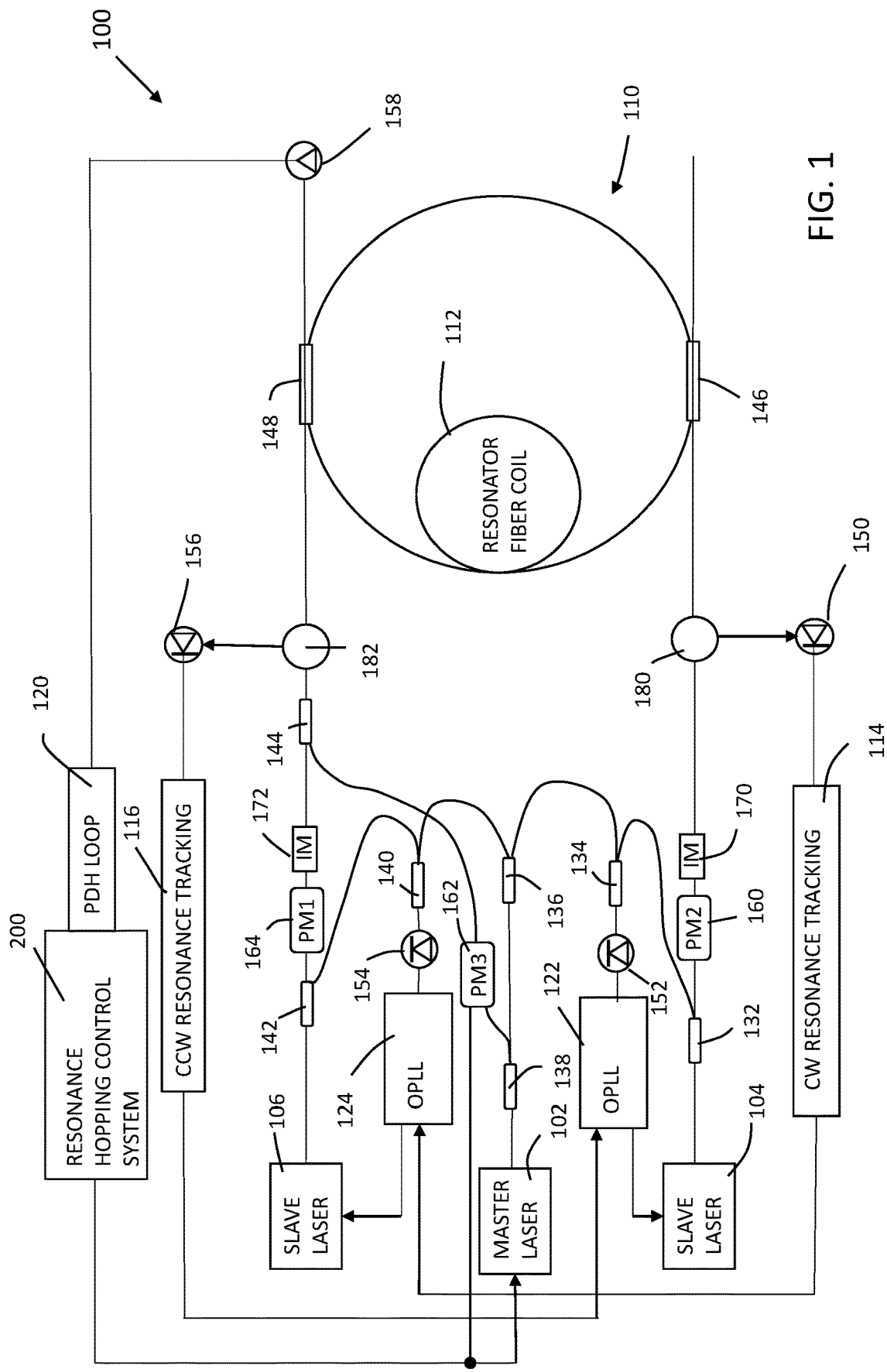
FIG. 1 is a block diagram of a RFOG according to one exemplary embodiment.

In the following detailed description, reference is made to the accompanying drawings, which form a part hereof, and in which is shown by way of illustration specific embodiments in which the inventions may be practiced. These embodiments are described in sufficient detail to enable those skilled in the art to practice the embodiments, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments provide systems and methods that reduce resonance asymmetry induced bias errors. The systems and methods are robust, low power, and can quickly average over a very large resonance-frequency range of the optical resonator. Embodiments reduce resonance asymmetry induced bias error with a resonance hopping technique in which optical resonances over a very large range of frequencies are quickly sampled to average over resonance asymmetries.

To avoid having lasers of the RFOG mode hop and thereby lose lock with the resonator, embodiments employ a technique in which the lasers briefly unlock, hop multiple resonance, and then relock. This keeps the lasers operating in a stable mode hop free region. This technique may be used to quickly average over a multiple resonances over a very large frequency range. Further embodiments employing this technique provide superior results from previous techniques in which a PZT is used to stretch the length of the resonator or by changing the temperature of the resonator. Resonance hopping can sample a much larger resonance-frequency range than the PZT and is much faster (and lower power) than changing the temperature.

In a RFOG, counterpropagating light, generated from lasers, are coupled to a fiber ring resonator. The counterpropagating light frequencies are locked to resonances in the CW and CCW directions. The center frequencies for the CW and CCW resonances are measured, and the difference of these two center frequencies provides the signal that is proportional to the rotation rate of the gyro. Any resonance asymmetry on the measured resonances produces a bias error on the signal as well. To mitigate this error, in embodiments, the laser(s) that generate the counterpropagating light (CW and CCW laser light) are briefly unlocked, quickly tuned to another set of resonances, and then relocked. The center frequencies are again measured, and a new rate signal is generated. This is repeated multiple times per second to sample over a number a resonance frequencies (and thereby a number of resonance asymmetries) over a large range of optical frequencies. Since the resonance asymmetry can vary in sign (widening the low-frequency or the high-frequency side of the resonance) this technique averages over the bias errors caused by the resonance asymmetries and thus provides a more accurate value for the true center frequencies and thus a more accurate gyro rate.

There are many different RFOG configurations that may include aspects of embodiments described herein. One example is illustrated in FIG. 1. FIG. 1 illustrates a block diagram of an example RFOG 100 with components that can implement techniques described above. The RFOG 100 of this embodiment includes slave laser 106 that generates light in a CW direction in a resonator 110 and slave laser 104 that generates laser light in a CCW direction in the resonator 110. A master laser 102, is used in this example, to control the frequency of the light generated by the slave lasers 104 and 106 as discussed in detail below. Further, as discussed below, the resonance hopping is provided, in this example, by resonance hopping control system 200 that controls the resonance of laser light provided by the master laser 102.

The example RFOG 100 may function as part of a navigation system, a platform stabilization system, a pointing system, and the like. For example, in some embodiments, the RFOG 100 is implemented as part of an inertial sensor unit that includes one or more RFOGs and one or more linear accelerometers. The RFOG 100 may measure rotation rate and may output a signal indicative of the rotation rate. The measured rotation rate from the RFOG 100 may be provided to a processing unit or other computational device that uses the measured rotation rate when calculating parameters such as position, orientation, and angular velocity. Additionally, the calculated parameters may be used to calculate data to be included in control signals that are provided to one or more optional actuators for controlling the operation of the actuators.

Further, in at least one implementation, the RFOG 100 includes transmission and reflection mode feedback control. To provide transmission and reflection mode feedback control, light waves from the laser sources 102, 104, and 106 may circulate through the resonator coil 112 of resonator 110. Slave lasers 104 and 106 are optically coupled into the resonator 110 at ports 146 and 148 so that laser light can propagate within the resonator fiber coil 112 of the resonator 110. In at least one implementation, the ports 146 and 148 include a mirror, a fiber optic coupler, waveguide, a waveguide coupler, or other suitable component for coupling laser light into and out of the resonator 110. In at least one embodiment, the ports 146 and 148 function as both an input port and an output port. For example, the port 148 couples the laser light into the resonator 110 in a first direction (e.g., CW) and out of the resonator 110 in a second direction (e.g., CCW). Similarly, port 146 couples the laser light into the resonator 110 in the second direction (e.g. CCW) and out of the resonator 110 in the first direction (e.g. CW). In alternative implementations, the resonator 110 may have separate input ports and output ports.

In some embodiments, laser light coupled into the resonator 110 has a "transmission port" and a "reflection port." In general, all the laser light detected at a transmission port has propagated through the resonator 110, whereas at the reflection port there is combination of the portion of the resonator incident light that did not enter the resonator 110 and laser light that has propagated through the resonator 110. For example, the port 146 functions as both a transmission port for the light coupled into the resonator 110 through the port 148 and as a reflection port for light incident on the resonator 110 at port 146. Port 148 functions as both a transmission port for the light coupled into the resonator 110 through the port 143 and as a reflection port for light incident on the resonator 110 at port 148.

In certain implementations, laser light that is coupled into the resonator 110 is frequency stabilized using the resonator 110 with feedback control based on light acquired from the transmission ports at ports 146 and 148. Further, in certain implementations where a light produced by a master laser source 102 is used to further stabilize the frequency of the light propagating within the resonator 110, light can also be acquired through the reflection port at port 148. Using feedback control, electromagnetic waves that propagate within the resonator 110, may be stabilized, at both high and low frequencies. Thus, stabilization over a wide bandwidth may be achieved.

In at least one implementation, feedback control may reduce laser phase noise using the Pound-Drever-Hall (PDH) technique. A laser source with PDH feedback control receives a signal from a PDH photodetector 158 that senses light from the reflection port 148 associated with the master laser 102. The response to changes in relative frequency between light produced by a laser source and resonant frequency within the resonator 110 is much faster at the reflection port 148 than one of the transmission ports 148 and 146. To stabilize the laser produced by the master laser source 102 and, thus reduce the relative phase noise between the laser produced by the master laser source 102 and resonant frequency at the resonator 110, the light produced by the master laser source 102 is locked onto a CW resonance of the resonator 110 by using a PDH feedback control loop 120. This may be done by locking the carrier frequency of the master laser source to a resonance center or locking a modulation sideband to the resonance center.

In certain implementations, where light produced by a master laser source 102 is controlled through PDH feedback, the light output by the master laser source 102 may be coupled with light produced by multiple slave laser sources 104 and 106 through couplers 138, 136, 140 and 134. For example, the master laser 102 provides laser light to the coupler 138. The coupler 138 provides a portion of the light for circulation within the resonator 110 and another portion of the light to the coupler 136. The coupler 136 provides a portion of the light to the coupler 140 and another portion of the light to the coupler 134. The coupler 140 couples together a portion of the master laser from the coupler 136 along with a portion of light from slave laser 106 and provides the combined light to the CW OPLL 124 via photo detector 154. Further, coupler 134 couples a portion of the light from the master laser from coupler 136 along with a portion of light from slave laser 104 and provides the combined light to the CCW OPLL 122 via photo detector 152.

The output of the master laser 102 is coupled into the resonator 110 through couplers 138 and 149, phase modulator (PM) 162, circulator 182 and port 148. The master laser 102 is configured to generate laser light for propagation within the resonator 110. The output of slave laser 104 is coupled into the resonator 110 through coupler 132, PM 160, intensity modulator (IM) 170, circulator 180 and port 146 in this example embodiment. The output of slave laser 106 is coupled into the resonator 110 through coupler 142, PM 164, IM 172, circulator 182 and port 148 in this example embodiment.

The light produced by the master laser source 102 receives PDH feedback through the PDH feedback control loop 120 for locking the frequency of the light from the master laser 102 to the resonator 110 resonance. For example, the PDH feedback control loop 120 may include a PDH photodetector 158 that receives light from the reflection port 148 of the resonator 110. The PDH feedback control loop 120 is further coupled to the master laser source 110 via a current source in an embodiment, where the current source controls the master frequency in an embodiment.

In certain embodiments, the low relative frequency noise between the light produced by the master laser source 102 and resonance frequency of the resonator 110 is transferred to the laser light produced by the slave laser sources 104 and 106 by employing optical phase locked loops (OPLLs) 122 and 124. The OPPLs 122 and 124 are configured to lock the light produced by the slave laser sources 104 and 106 to the light produced by the master laser source 102 with some additional frequency offset. To lock the laser light produced by the slave laser sources 106 and 104 to corresponding resonance frequencies of the resonator 110, transmission mode feedback control loops 114 and 116 (or CW and CCW resonance tracking loops 114 and 116) may be used to lock the optical carriers of slave laser sources 106 and 104 to resonance centers (also referred to herein as simply "resonance") of the resonator 110.

In this example embodiment, the CCW resonance tracking loop 116 is associated with the slave laser source 104 and the CW resonance tracking loop 114 is associated with slave laser source 106, where the resonance control loops 116 and 114 may receive signals from respective photodetectors 156 and 150. Photodetector 156 receives light from the transmission port 148 via circulator 182 and the photodetector 150 receives light from the transmission port 146 via circulator 180. For example, when the RFOG 100 has slave laser 104 producing a first laser light and slave laser 106 producing a second laser light, the first laser light is propagating in the CCW direction and the second laser light is propagating in the CW direction in the resonator 110 and resonator fiber coil 112. As used herein, "CW" and "CCW" are terms used to further indicate that first slave laser and the second slave laser are propagating in opposite directions within the resonator 100. Additionally, a portion of the first laser light and a portion of the second laser light are coupled out of the resonator 110, where the respective transmission mode feedback control loops 114 and 116 determine adjustments to be made by the slave laser sources 106 and 104 to change the frequencies of the slave lasers 106 and 104 such that the CW and CCW slave laser light propagates within the resonator 110, on a resonance of the resonator, at the center frequency of the resonant mode of the resonator 110.

In some embodiments, employing high frequency phase modulation referred to as Sideband Heterodyne Detection modulation, the first order modulation sidebands are locked to resonance centers whereas the laser optical carrier is locked off resonance and in the middle of the free spectral range between two resonance peaks. Henceforth, locking a laser onto a resonance mode, on a resonance, or at the center frequency of the resonant mode, can mean locking the optical carrier to a resonance center or locking first order modulation sidebands to resonance centers. In this case, the optical carriers of the slave lasers sources 106 and 104 may be locked to an offset from the resonance centers, and that offset may be one half free spectral range of the resonator.

A discussed above, a portion of the propagating CW laser light in the resonator 110 is coupled out of the resonator 110 by a coupler that functions as a transmission port 146. The portion of the coupled-out CW laser light is directed to photodetector 150 via circulator 180. Photodetector 150 may provide an electrical signal to CW resonance tracking electronics in the CW resonance tracking loop 114. The CW resonance tracking electronics may track departures of the frequency of slave laser 106 from the center frequency of resonant modes of the resonator 110 and provide a signal to CW OPLL 124 indicative of the departure from resonance. The CW OPLL 124 may provide a signal to a current source that adjusts the drive current for the second slave laser source 106 such that the frequency of the second laser moves closer to a resonance center frequency of the resonant mode of the resonator 110.

Similarly, a portion of the propagating CCW laser light in the resonator 110 is coupled out of the resonator 110 by a coupler that functions as a transmission port 148. The portion of the coupled-out CCW laser light is directed to photodetector 156 via a circulator 182. The photodetector 156 may detect the first slave laser and may provide an electrical signal to CCW resonance tracking electronics in the CCW resonance tracking loop 116. The CCW resonance tracking electronics may track departures of the frequency of the first slave laser from the center frequency of a resonant mode of the resonator 110 and provide a signal to the CCW OPLL 122 indicative of the departure from resonance. The CCW OPPL 122 may provide a signal to a current source that adjusts the drive current for the first laser source 104 such that the frequency of the first laser moves closer to a resonant mode of the resonator 110.

Figure 2:
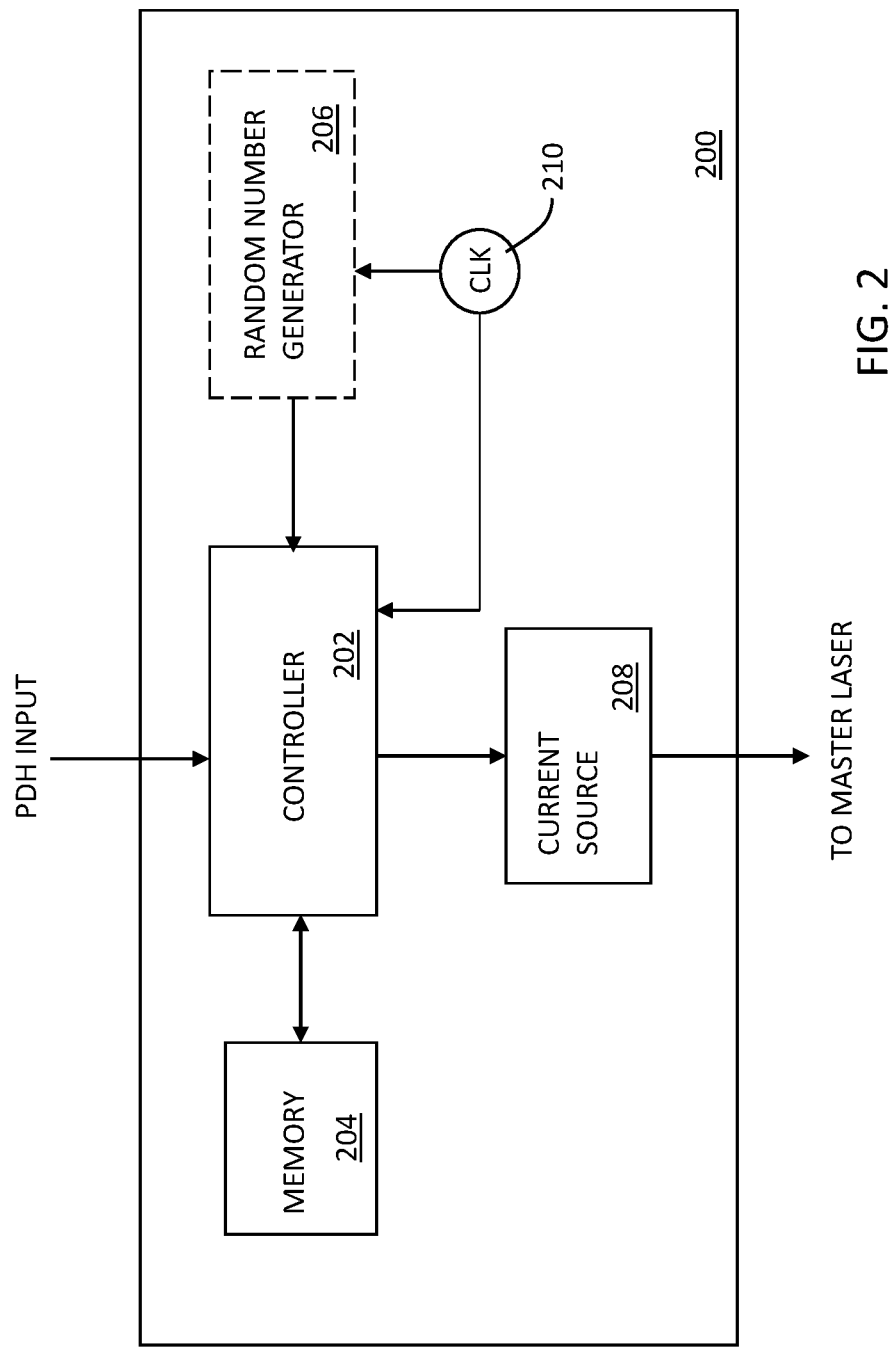
FIG. 2 is a block diagram of a resonance hopping control system according to one exemplary embodiment.

As discussed above, embodiments force resonance hopping. In one example, the hopping may be controlled via the PDH feedback control loop 120. For example, the PDH loop 120 may include a resonance hopping control system 200. An example of a resonance hopping control system 200 is illustrated in the block diagram of FIG. 2. In this example, the resonance hopping control system 200, includes a controller 202 and a memory 204 that at least stores operating instructions that are executed by the controller 202.

In general, the controller 202 may include any one or more of a processor, microprocessor, a digital signal processor (DSP), an application specific integrated circuit (ASIC), a field program gate array (FPGA), or equivalent discrete or integrated logic circuitry. In some example embodiments, controller 202 may include multiple components, such as any combination of one or more microprocessors, one or more controllers, one or more DSPs, one or more ASICs, one or more FPGAs, as well as other discrete or integrated logic circuitry. The functions attributed to the controller 202 herein may be embodied as software, firmware, hardware or any combination thereof. The controller may be part of a system controller or a component controller. The memory 204 may include computer-readable operating instructions that, when executed by the controller 202 provides functions of the resonance hopping control system 200. Such functions may include the functions of resonance hopping described below. The computer readable instructions may be encoded within the memory 204. Memory 204 is an appropriate non-transitory storage medium or media including any volatile, nonvolatile, magnetic, optical, or electrical media, such as, but not limited to, a random access memory (RAM), read-only memory (ROM), non-volatile RAM (NVRAM), electrically-erasable programmable ROM (EEPROM), flash memory, or any other storage medium.

Further included in the resonance hopping control system 200 is a current generator 208 that provides a select amount of the current to the master laser 102 to selectively control the frequency of the laser light output by the master laser 102 and hence the frequencies of the CW and CCW laser light output from the respective slave lasers 106 and 104. In one example embodiment, a random number generator 206, that is communicatively coupled to a clock 210, may be used to generate a random number to the controller 202. The controller 202 uses random numbers from the random number generator 206 to select the resonance to hop to within a window (or range) that keeps the lasers operating in a single mode as discussed below.

Other embodiments use different methods for resonance hopping, such as but not limited to, alternating hops within a window (or range) in different directions from a central frequency in the window, hopping a select amount in both directions from a central frequency in the window and sequentially hopping off in one direction and then hopping off sequentially in another direction within the window. Hence, there are many ways anticipated to implement the hopping. Since, the hopping in embodiments may occur in the order of milliseconds, a large number of hops occur fairly quickly. As discussed above, this unlocking and locking of the lasers caused by the resonance hopping cause the bias instability errors to average out. The more hops the better the result. In one example embodiment, the window is determined by the controller 202 via operating instructions stored in the memory 204. The window is based on a frequency range in which the laser(s) can operate in a single mode and while its light or a portion of its light (for instance, a sideband) is at resonance in the resonator 110.

As discussed above, embodiments force resonance hopping within a window (or range) so the lasers are operating within their own single mode, single frequency range. If the lasers run out of their range, they operate in multimode where they are lasing in more than one mode occurs which causes errors in the system. Due to factors, such as for example temperature changes, the resonance mode of the resonator 110 may vary during operation. This causes the window (or range) that allows the lasers to operate in single mode to shift to correlate with the changing resonance mode frequency of the resonator 110. In embodiments, hop control logic also in the PDH loop 120 is used to resonance hop when it is determined the resonance is getting close to an edge (rail) of a window.

Figure 3:
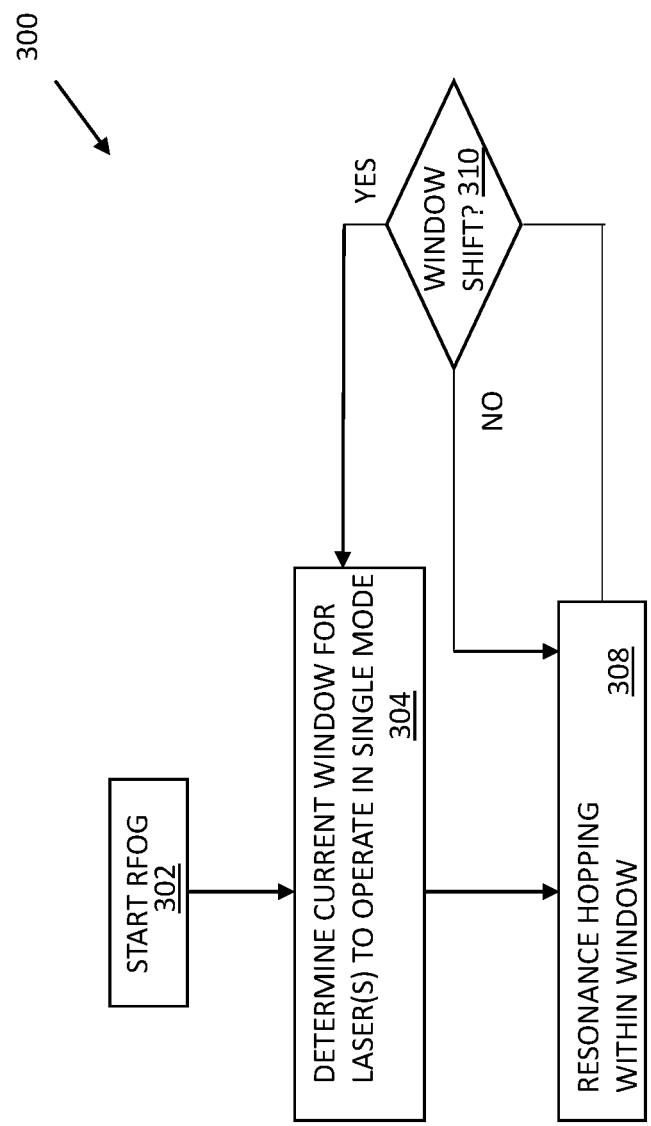
FIG. 3 illustrates a resonance hopping flow diagram according to one exemplary embodiment.

Referring to FIG. 3, a resonance hopping flow diagram 300 of one example embodiment is illustrated. The resonance flow diagram is provided as a series of sequential blocks. The sequence of block may be different in other embodiments. Hence, embodiments are not limited to the sequence illustrated in FIG. 3.

The resonance hopping flow diagram 300 begins when the RFOG 100 is started at block (302). The current window for each laser to operate in a single mode is determined in block (304). In the example above, with the master-slave laser arrangement, it is the current window of the master laser 102 that is determined since the master laser 102 controls the slave lasers 104 and 106. In one example embodiment, the PDH loop 120 is used to determine the then current window. In one embodiment, the controller 202 in the PDH loop determines the window. This may be enabled, in part, by storing of factory-taken laser characterization data in memory of the controller 202.

Once the current window is determined at step (304), resonance hopping occurs within the window at block (308). As discussed above, the resonance hopping can occur by any method that generates frequencies within the window including, but not limited to, the use of a random number generator and sequence hopping on opposite sides of a central frequency of the window. While the resonance hopping is occurring, it is determined at block (310) whether the window has shifted. The determination may be conducted in the PDH loop as discussed above. In one embodiment the determination may be done by the resonance hopping control logic and/or the controller 202.

If the window has not shifted, the process continues at block (308) resonance hopping within the current window. If the window has shifted, the current window for the laser(s) to operate in a single mode is redetermined at block (304) and the process continues.

Figure 4:
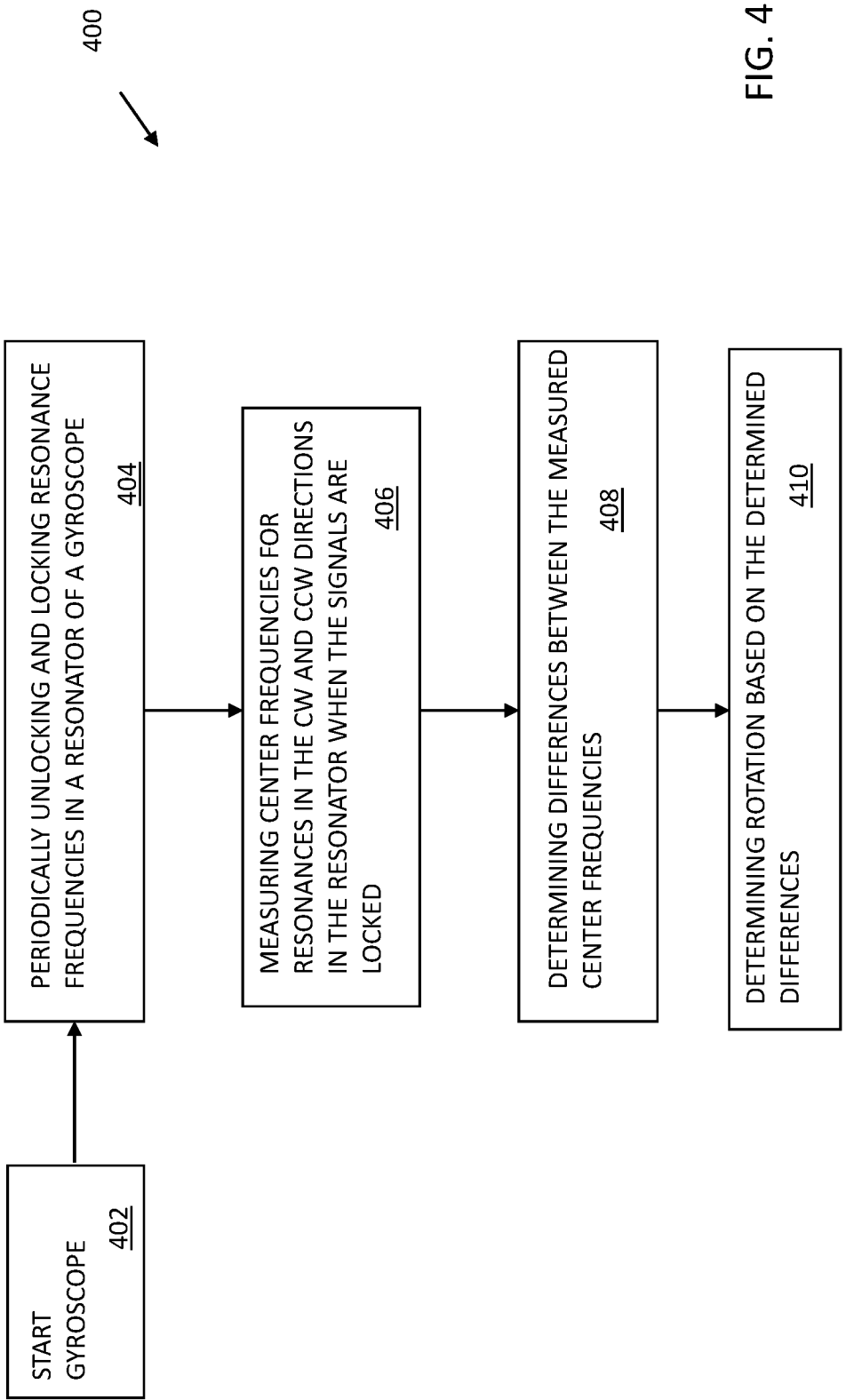
FIG. 4 illustrates a gyroscope operational flow diagram according to one exemplary embodiment.

FIG. 4 illustrates a gyroscope operational flow diagram 400 of one embodiment. Flow diagram 400 is provided as a series of sequential blocks. The sequence may be different in other example embodiments. Hence, embodiments are not limited to the sequence provided in FIG. 4.

The gyroscope operational diagram starts at block (402) when the gyroscope is started. While operational, the laser frequencies of light propagating in the resonator of the gyroscope are periodically unlocked and locked at block (404). In some embodiments, the period of unlocking and locking to resonance frequencies is multiple times per second. Further in some embodiments, each time the lasers frequencies are locked to a set of resonance frequencies, a different set of resonance frequencies is used (e.g. frequency hopping).

The center frequencies for resonances in the CW and CCW directions in the resonator are measured when the light signal frequencies are locked at block (406). The differences between the measured center frequencies is determined at block (408). Rotation measured by the gyroscope is determined at block (410) based on the determined differences of the of the centered measured frequencies.

EXAMPLE EMBODIMENTS

Example 1 is a resonator fiber optic gyroscope (RFOG) that includes at least one laser, a resonator and a resonator hopping control system. The resonator is in operational communication with the at least one laser to receive a clockwise (CW) laser light and counterclockwise (CCW) laser light produced by the at least one laser. The resonance hopping control system is in communication with an output of the resonator and the at least one laser. The resonance hopping control system is configured to control an output of the at least one laser to periodically unlock, hop and lock frequencies of the laser light traveling in the CW and CCW directions in the resonator to resonance frequencies of the resonator to mitigate bias errors due to resonance asymmetries.

Example 2 includes the RFOG of Example 1, wherein the at least one laser further includes a master laser and first and second slave lasers. The master laser is operationally controlled by the resonance hopping control system. The first slave laser is used to generate the CW laser light in the resonator. The first slave laser is operationally controlled by the master laser. The second slave laser is used to generate the CCW laser light in the resonator. The second slave laser is operationally controlled by the master laser.

Example 3 includes the RFOG of Example 2, further including a first optical phase lock loop (OPPL) and a second OPPL. The first OPLL is coupled to a CW output of the resonator via CW resonance tracking loop. The first OPPL is further in communication with the first slave laser. The second OPLL is coupled to a CCW output of the resonator via a CCW resonance tracking loop. The second OPPL is further in communication with the second slave laser.

Example 4 includes the RFOG of Example 2, further including a Pound-Drever-Hall (PDH) feedback control loop coupled to at least an output of the resonator. The PDH feedback loop further in communication with the master laser.

Example 5 includes the RFOG of Example 4, wherein the resonance hopping control system is within the PDH feedback control loop.

Example 6 includes the RFOG of any of the Examples 1-5, wherein the resonance hopping control system further includes at least one controller configured to cause the at least one laser to unlock, hop and lock its frequency relative to resonance frequencies of the resonator.

Example 7 includes the RFOG of Example 6, further including at least one memory configured to store operating instructions executed by the controller in causing the at least one laser of unlock, hop and lock its frequency relative to resonance frequencies of a resonator.

Example 8 includes the RFOG of Example 6, further including a random number generator used by the controller to at least in part determine a resonance frequency to hop to.

Example 9 includes the RFOG of Example 6, wherein the controller is further configured to unlock, hop and lock to resonance frequencies multiple times per second.

Example 10 includes any of the Examples 1-10, wherein the resonance hopping control system is further configured to hop within a window of frequencies that allow the at least one laser to be within a single mode operation.

Example 11 is a method of reducing gyroscope bias errors due to resonance asymmetries. The method includes periodically unlocking, hopping and locking frequencies of laser light traveling in clockwise (CW) and counter-clockwise (CCW) directions in a resonator of a gyroscope to mitigate bias errors due to resonance asymmetries; measuring center frequencies of resonances in the CW and CCW directions of the resonator when the signals indicate that light is locked on the resonance frequencies; determining differences between the measured center frequencies of the resonances in the CW and CCW directions; and determining a rotation rate of the gyroscope based at least in part on the determined differences.

Example 12 includes the method of Example 11, wherein the hopping occurs over multiple resonances.

Example 13 includes the method of any of the Examples 11-12, wherein the period of unlocking, hopping and locking to resonance frequencies is multiple times per second.

Example 14 includes the method of any of the Examples 11-13, further including determining a window of frequencies that allows at least one laser that generates the CW and CCW laser light in the resonator to be within a single mode operation; and hopping within the determined window.

Example 15 includes the method of claim 14, wherein the window changes based on the then current resonance mode of the resonator.

Example 16 includes a method of reducing gyroscope bias errors due to resonance asymmetries, the method includes generating clockwise (CW) laser light in a resonator with a first slave laser; generating counterclockwise (CCW) laser light in the resonator with a second slave laser; controlling outputs of the first slave laser and the second slave laser with a master laser; and periodically, unlocking frequencies of the CW laser light and CCW laser light from a resonance of the resonator, hopping the CW laser light and CCW laser light to a different resonance frequency of the resonator within a window of frequencies, wherein the window of frequencies allows the first slave laser, the second slave laser and the maser slave laser to remain in a single mode of operation, and locking the CW laser light and the CCW laser light to the hopped different resonance frequency.

Example 17 includes the method of Example 16, wherein the periodic unlocking, hopping and locking occurs multiple times per second.

Example 18 includes the method of any of the Examples 16-17, wherein the hopping occurs over multiple resonances.

Example 19 includes the method of any of the Examples 16-18, wherein the window changes based on the then current resonance mode of the resonator.

Example 20 includes the method of any of the Examples 16-19, wherein the different resonance frequency is selected based at least in part on one of a sequential order and a random number generator.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A resonator fiber optic gyroscope (RFOG) comprising:
at least one laser;
a resonator in operational communication with the at least one laser to receive clockwise (CW) laser light and counterclockwise (CCW) laser light produced by the at least one laser; and
a resonance hopping control system in communication with an output of the resonator and the at least one laser, the resonance hopping control system is configured to control an output of the at least one laser to periodically unlock, hop and lock frequencies of the laser light traveling in the CW and CCW directions in the resonator to resonance frequencies of the resonator to mitigate bias errors due to resonance asymmetries.

2. The RFOG of claim 1, wherein the at least one laser further comprises:
a master laser operationally controlled by the resonance hopping control system;
a first slave laser to generate the CW laser light in the resonator, the first slave laser operationally controlled by the master laser; and
a second slave laser to generate the CCW laser light in the resonator, the second slave laser operationally controlled by the master laser.

3. The RFOG of claim 2, further comprising:
a first optical phase lock loop (OPLL) coupled to a CW output of the resonator via CW resonance tracking loop, the first OPPL further in communication with the first slave laser; and
a second optical phase lock loop (OPLL) coupled to an CCW output of the resonator via a CCW resonance tracking loop, the second OPPL further in communication with the second slave laser.

4. The RFOG of claim 2, further comprising:
a Pound-Drever-Hall (PDH) feedback control loop coupled to at least an output of the resonator, the PDH feedback loop further in communication with the master laser.

5. The RFOG of claim 4, wherein the resonance hopping control system is within the PDH feedback control loop.

6. The RFOG of claim 1, wherein the resonance hopping control system further comprises:
at least one controller configured to cause the at least one laser to unlock, hop and lock its frequency relative to resonance frequencies of the resonator.

7. The RFOG of claim 6, further comprising:
at least one memory configured to store operating instructions executed by the controller in causing the at least one laser of unlock, hop and lock its frequency relative to resonance frequencies of a resonator.

8. The RFOG of claim 6, further comprising:
a random number generator used by the controller to at least in part determine a resonance frequency to hop to.

9. The RFOG of claim 6, wherein the controller is further configured to unlock, hop and lock to resonance frequencies multiple times per second.

10. The RFOG of claim 1, wherein the resonance hopping control system is further configured to hop within a window of frequencies that allow the at least one laser to be within a single mode operation.

11. A method of reducing gyroscope bias errors due to resonance asymmetries, the method comprising:
periodically unlocking, hopping and locking frequencies of laser light traveling in clockwise (CW) and counterclockwise (CCW) directions in a resonator of a gyroscope to mitigate bias errors due to resonance asymmetries;
measuring center frequencies of resonances in the CW and CCW directions of the resonator when the signals indicate that light is locked on the resonance frequencies;
determining differences between the measured center frequencies of the resonances in the CW and CCW directions; and
determining a rotation rate of the gyroscope based at least in part on the determined differences.

12. The method of claim 11, wherein the hopping occurs over multiple resonances.

13. The method of claim 11, wherein the period of unlocking, hopping and locking to resonance frequencies is multiple times per second.

14. The method of claim 11, further comprising:
determining a window of frequencies that allows at least one laser that generates the CW and CCW laser light in the resonator to be within a single mode operation; and
hopping within the determined window.

15. The method of claim 14, wherein the window changes based on the then current resonance mode of the resonator.

16. A method of reducing gyroscope bias errors due to resonance asymmetries, the method comprising:
generating clockwise (CW) laser light in a resonator with a first slave laser;
generating counterclockwise (CCW) laser light in the resonator with a second slave laser;
controlling outputs of the first slave laser and the second slave laser with a master laser; and
periodically,
unlocking frequencies of the CW laser light and CCW laser light from a resonance of the resonator,
hopping the CW laser light and CCW laser light to a different resonance frequency of the resonator within a window of frequencies, wherein the window of frequencies allows the first slave laser, the second slave laser and the maser slave laser to remain in a single mode of operation, and
locking the CW laser light and the CCW laser light to the hopped different resonance frequency.

17. The method of claim 16, wherein the periodic unlocking, hopping and locking occurs multiple times per second.

18. The method of claim 16, wherein the hopping occurs over multiple resonances.

19. The method of claim 16, wherein the window changes based on the then current resonance mode of the resonator.

20. The method of claim 16, wherein the different resonance frequency is selected based at least in part on one of a sequential order and a random number generator.

* * * * *